| (12) | United States Patent | (10) Patent No.: | US 12,250,499 B2 |
|---|---|---|---|
| | Scarbrough et al. | (45) Date of Patent: | Mar. 11, 2025 |

(54) CAPTURING VIDEO DATA OF EVENTS ASSOCIATED WITH VEHICLES

(71) Applicant: Micron Technology, Inc., Boise, ID (US)

(72) Inventors: Alyssa Scarbrough, Boise, ID (US); John Hopkins, Meridian, ID (US); Zahra Hosseinimakarem, Cupertino, CA (US); Yi Hu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 304 days.

(21) Appl. No.: 17/806,888

(22) Filed: Jun. 14, 2022

(65) Prior Publication Data

US 2023/0386268 A1 Nov. 30, 2023

Related U.S. Application Data

(60) Provisional application No. 63/365,462, filed on May 27, 2022.

(51) Int. Cl.
| *H04N 7/18* | (2006.01) |
|---|---|
| *G07C 5/08* | (2006.01) |
| *H04N 23/60* | (2023.01) |
| *H04N 23/65* | (2023.01) |

(52) U.S. Cl.
CPC ........... *H04N 7/188* (2013.01); *G07C 5/0808* (2013.01); *G07C 5/0866* (2013.01); *H04N 7/183* (2013.01); *H04N 23/60* (2023.01); *H04N 23/65* (2023.01)

(58) Field of Classification Search
CPC .... G07C 5/0808; G07C 5/0866; G07C 5/008; H04N 7/183; H04N 7/188; H04N 23/65; H04N 23/60
See application file for complete search history.

(56) References Cited

U.S. PATENT DOCUMENTS

| 6,076,028 | A | * | 6/2000 | Donnelly | ............... B60R 21/013 |
|---|---|---|---|---|---|
| | | | | | 701/45 |
| 2013/0325250 | A1 | * | 12/2013 | Cawse | .................. G07C 5/0808 |
| | | | | | 701/33.1 |
| 2021/0097315 | A1 | * | 4/2021 | Carruthers | ........ G08B 13/19645 |

FOREIGN PATENT DOCUMENTS

| CN | 110329271 | * 10/2019 | ............. G01C 21/16 |
|---|---|---|---|
| IN | 2316CH2013 A | * 6/2015 | |

\* cited by examiner

*Primary Examiner* — Joan T Goodbody
*Assistant Examiner* — Michael Lukon
(74) *Attorney, Agent, or Firm* — Harrity & Harrity, LLP

(57) ABSTRACT

In some implementations, a device may receive, from a sensor of a vehicle, sensor data. The device may detect whether an event causing damage to the vehicle has occurred or is expected to occur based on the sensor data being greater than a threshold, wherein the threshold is based on an on-off status of the vehicle and a sensor type. The device may activate, based on whether the event has occurred or is expected to occur, a camera of the vehicle to capture video data of a scene associated with the vehicle. The device may transmit, to a server, an indication that indicates the event and the video data.

25 Claims, 8 Drawing Sheets

CAPTURING VIDEO DATA OF EVENTS ASSOCIATED WITH VEHICLES

CROSS-REFERENCE TO RELATED APPLICATION

This patent application claims priority to U.S. Provisional Patent Application No. 63/365,462, filed on May 27, 2022, and entitled "CAPTURING VIDEO DATA OF EVENTS ASSOCIATED WITH VEHICLES." The disclosure of the prior application is considered part of and is incorporated by reference into this patent application.

TECHNICAL FIELD

The present disclosure generally relates to vehicle security and, for example, capturing video data of events associated with vehicles.

BACKGROUND

A vehicle security system may be installed in a vehicle to discourage theft of the vehicle, theft of contents in the vehicle, and/or damage to the vehicle. The vehicle security system may include sensors installed in various locations of the vehicle. The sensors may include shock sensors or impact sensors, which may detect vibrations that occur due to an impact to the vehicle (e.g., breaking a window of the vehicle). The vehicle security system may include an alarm to emit a noise when the sensors detect vibrations that satisfy a threshold.

DETAILED DESCRIPTION

Figure 1A:
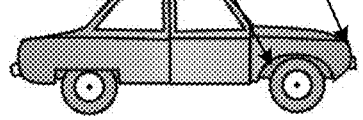
FIGS. 1A-1B are diagrams illustrating an example associated with capturing video data of events associated with vehicles using an on-demand video capturing camera.

A vehicle may be equipped with a vehicle security system to discourage theft of the vehicle, theft of contents in the vehicle, and/or damage to the vehicle. The vehicle security system may include one or more sensors that are installed on an exterior of the vehicle. For example, the vehicle security system may include a shock sensor or an impact sensor, which may detect vibrations that occur due to an impact to the vehicle (e.g., breaking a window of the vehicle). The vehicle security system may include a motion sensor or a proximity sensor to detect motion outside of the vehicle. When a sensor of the vehicle security system detects a vibration or a motion that satisfies a threshold, the sensor may send a signal to the vehicle security system, which may send a signal to an alarm associated with the vehicle security system. The alarm may emit a noise based on the signal received from the vehicle security system, where the noise may function to notify users in proximity to the vehicle (e.g., users that are within hearing distance from the vehicle) that an event has occurred with the vehicle. The event may be an incident, such as a vehicle break-in, vehicle vandalism, and/or a vehicle collision involving the vehicle and/or another vehicle. Additionally, or alternatively, the vehicle security system may send a notification to a device (e.g., a mobile device) of a user associated with the vehicle. The notification may indicate that the event has occurred.

The vehicle security system may have an ability to record video data of the event using a camera of the vehicle security system. The camera may be triggered to record the video data based on a signal from one of the sensors of the vehicle security system, or the camera may continually record video data. The video data may be accessible to the user to learn about the event (e.g., time of event, other vehicles in the event, and/or perpetrators involved in the event).

One problem with the vehicle security system is an inability for the vehicle security system to accurately detect the event when the vehicle is turned on and/or moving versus when the vehicle is turned off, which may cause the vehicle security system to mistakenly not capture video data when an actual event occurs or mistakenly capture video data when no event occurs. When the vehicle security system is triggered to capture video data based on detecting the event, another problem with the vehicle security system may be an inability to accurately determine when to stop capturing the video data. The vehicle security system may simply capture the video data for a preset amount of time (e.g., 10 minutes) after detecting the event, regardless of whether all of the video data is related to the event. When the vehicle security system continuously captures video data, another problem with the vehicle security system may be an inability to accurately determine a portion of video data that corresponds to the event. The vehicle security system may simply store video data that starts at a preset amount of time (e.g., 5 minutes) before the event is detected and ends at a preset amount of time (e.g., 10 minutes) after the event is detected, regardless of whether all of the video data is related to the event. Another problem with the vehicle security system may be an inability to provide curated video data of the event to an external system. The vehicle security system may simply store video data associated with the event, and the user associated with the vehicle may access the video data to learn about the event. The user may need to spend an inordinate amount of time to play, rewind, and/or forward through the video data to learn about the event.

In some implementations described herein, to solve the problems described above, as well as how to accurately detect an event associated with a vehicle and capture video data of the event, a technical solution is described herein for a vehicle device associated with a vehicle to detect the event based on sensor data satisfying a threshold, where the threshold may be based on an on-off status of the vehicle and a sensor type. The vehicle device may detect the event by detecting that the event has occurred or by detecting that the event is expected to occur (e.g., the event is imminent). The vehicle device may receive the sensor data from one or more sensors of the vehicle. The on-off status of the vehicle may indicate whether the vehicle is turned on and/or moving, or whether the vehicle is turned off. The sensor type may correspond to an accelerometer, a gyroscope, a temperature sensor, an infrared sensor, a motion sensor, a microphone, and/or a chemical sensor. The vehicle device may store different thresholds corresponding to different on-off statuses and different sensor types, which may improve an accuracy of event detection. The vehicle device may compare the sensor data to a threshold associated with the on-off status of the vehicle and the sensor type associated with the sensor producing the sensor data, and based on the comparison and the sensor data satisfying the threshold, the vehicle device may detect the event. The event may be an incident that causes damage to the vehicle, such as a vehicle break-in, vehicle vandalism, and/or a vehicle collision involving the vehicle and/or another vehicle.

As an example, the vehicle device may detect the event when accelerometer data indicates a vibrational change that satisfies a first threshold associated with the accelerometer and an off status of the vehicle. As another example, the vehicle device may detect the event when gyroscope data indicates an angular velocity change that satisfies a second threshold associated with the gyroscope and an on status of the vehicle.

In some implementations, the vehicle device may include a camera to capture video data of a scene associated with the vehicle on demand (e.g., based on the event detection). The vehicle device may activate the camera to capture video data of the scene associated with the vehicle based on detecting the event. The scene may be associated with an exterior of the vehicle or an interior of the vehicle. The vehicle device may transmit, to a server and/or a mobile device of a user associated with the vehicle, an indication that indicates the event and the video data.

In some implementations, the camera may continuously capture video data of a scene associated with the vehicle, irrespective of whether the event is detected. When the event is detected, the vehicle device may identify a portion of the video data that corresponds to the event. For example, the vehicle device may identify time points associated with the event, and the vehicle device may identify corresponding time points in the video data captured by the camera. The vehicle device may extract, from the video data, the portion of the video data that corresponds to the event. The vehicle device may transmit, to the server and/or the mobile device, the portion of the video data and/or the indication of the event.

In some implementations, the vehicle device may be able to detect the event regardless of the on-off status of the vehicle by using the different thresholds. The different thresholds may be useful for detecting events when the vehicle is in motion versus when the vehicle is stationary (e.g., parked on a road). When the vehicle is in motion, some types of sensor data (e.g., accelerometer data) may be subjected to baseline noise, for example, due to road noise, engine noise, vehicle speed, vehicle make or model, or noise from other vehicles moving on the road. On the other hand, when the vehicle is stationary, sensor data (e.g., accelerometer data) may be subjected to lower baseline noise as compared to when the vehicle is moving. By using different thresholds depending on whether the vehicle is moving or stationary, depending on the on-off status of the vehicle, and/or depending on the vehicle speed and vehicle make/model, the vehicle device may be able to accurately detect the event. The vehicle device may be less likely to mistakenly not capture video data when an actual event occurs or mistakenly capture video data when no event occurs, as compared to the vehicle device using thresholds that are not dependent on the on-off status of the vehicle, the vehicle speed, and/or the vehicle make/model.

Figure 1B:
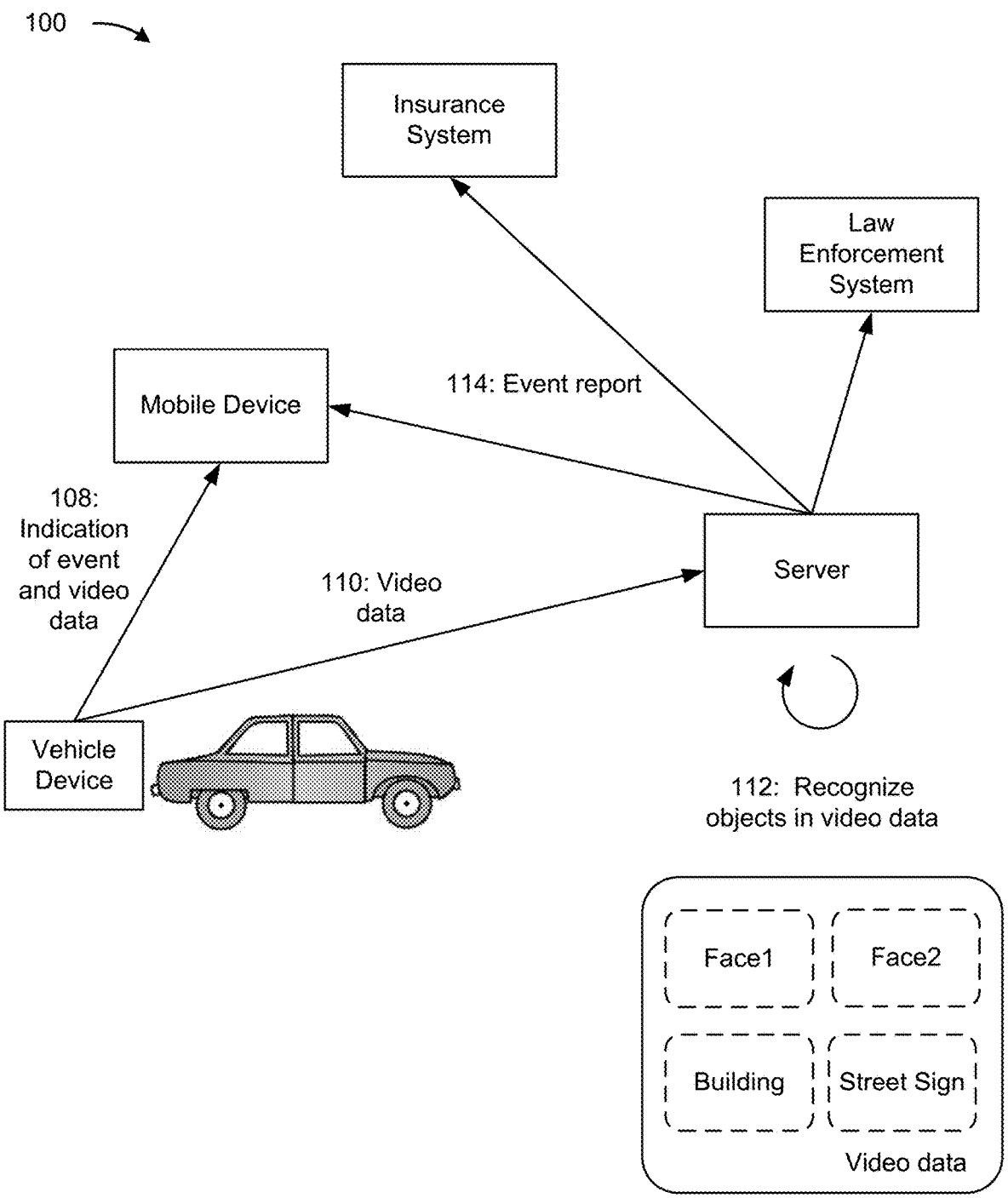

FIGS. 1A-1B are diagrams of an example 100 related to capturing video data of events associated with vehicles using an on-demand video capturing camera. As shown in FIGS. 1A-1B, example 100 includes a vehicle device associated with a vehicle, a mobile device, a server, an insurance system, and a law enforcement system. These devices are described in more detail in connection with FIGS. 3 and 4.

In some implementations, the vehicle device may be a standalone device (e.g., a dashboard device) that is connected to the vehicle via an auxiliary power outlet or a Universal Serial Bus (USB) port. When the vehicle device is the standalone device, sensors and a camera may be integrated with the vehicle device, and/or the vehicle device may be in communication with sensors and/or a camera integrated with the vehicle (e.g., via a communication port, such as a USB port). In some implementations, the vehicle device may be integrated with the vehicle (e.g., installed during a manufacturing of the vehicle). The vehicle device may include multiple components that are distributed to various locations of the vehicle. For example, the vehicle device may include a central processing device, which may perform data processing associated with detecting events.

In some implementations, the vehicle device may be associated with one or more sensors operable to capture sensor data. The sensors may be installed in various locations of the vehicle including an exterior of the vehicle and/or an interior of the vehicle. Sensors installed on the exterior of the vehicle may be installed on doors of the vehicle, windows of the vehicle, wheels of the vehicle, a trunk of the vehicle, a hood of the vehicle, a sunroof or moon roof of the vehicle, and/or a fuel or recharging compartment of the vehicle. Sensors installed on the interior of the vehicle may be installed on a steering wheel of the vehicle, a user interface of the vehicle, a dashboard of the vehicle, one or more seats of the vehicle, one or more doors of the vehicle, and/or a floor of the vehicle. A sensor may include an accelerometer that detects sensor data corresponding to vibrational changes associated with the vehicle. A sensor may include a gyroscope that detects sensor data corresponding to rotational changes associated with the vehicle. A sensor may include a temperature sensor that detects sensor data corresponding to temperatures associated with the vehicle. A sensor may include an infrared sensor or proximity sensor that detects sensor data corresponding to a presence of objects, humans, and/or animals outside of the vehicle or inside of the vehicle. A sensor may include a motion sensor that detects sensor data corresponding to motion outside of the vehicle or inside of the vehicle. A sensor may include a microphone that detects sensor data corresponding to a noise of the vehicle or a noise that has occurred outside of the vehicle or inside of the vehicle. A sensor may include a chemical sensor that detects sensor data corresponding to a smell associated with the vehicle. The sensor data may be associated with the exterior of the vehicle and/or the interior of the vehicle.

In some implementations, the vehicle device may be associated with one or more cameras that are able to capture video data of a scene associated with the vehicle. In some implementations, the cameras may capture a 360 degree view surrounding the vehicle. A camera may capture video data on-demand. In other words, the camera may typically be off or in a sleep mode. The camera may start capturing video data based on a signal received from the vehicle device. The cameras may be installed in various locations of the vehicle including the exterior of the vehicle and/or the interior of the vehicle. Cameras installed on the exterior of the vehicle may be installed at a front of the vehicle, at a back of the vehicle, and/or at sides of the vehicle. Cameras installed on the interior of the vehicle may be installed at a front of a vehicle cabin, or at a back of the vehicle cabin.

In some implementations, when the vehicle is turned on, the vehicle may include a power source that supplies power to the cameras and the sensors. The power source may charge rechargeable batteries of the cameras and the sensors when the vehicle is turned on. When the vehicle is turned off (e.g., when an engine of the vehicle is turned off), the cameras and the sensors may function using the rechargeable batteries. Further, the vehicle device may include a rechargeable battery that allows the vehicle device to detect events when the vehicle is turned off.

As shown in FIG. 1A, and by reference number 102, the vehicle device may receive sensor data from one or more sensors. The vehicle device may receive the sensor data when the vehicle is turned on and stationary, when the vehicle is turned on and moving, and/or when the vehicle is turned off. The vehicle device may receive the sensor data from the sensors installed at various locations on the exterior of the vehicle and/or the interior of the vehicle. The sensor data may include accelerometer data received from the accelerometer, gyroscope data received from the gyroscope, temperature data received from the temperature sensor, infrared data received from the infrared sensor, motion data received from the motion sensor, sound data received from the microphone, and/or smell data received from the chemical sensor. Depending on the sensor type, the vehicle device may only receive sensor data associated with that sensor type when the vehicle is turned on, since not all types of sensors may be operable when the vehicle is turned off.

As shown by reference number 104, the vehicle device may detect an event when the vehicle is turned on and stationary, when the vehicle is turned on and moving, or when the vehicle is turned off. The event may be an incident that causes damage to the vehicle. The vehicle device, when detecting the event, may detect whether the event has occurred or is expected to occur. The vehicle device may detect the event based on the sensor data satisfying a threshold, where the threshold may be based on an on-off status of the vehicle and a sensor type. The on-off status may indicate whether the vehicle is turned on and stationary, whether the vehicle is turned on and moving, and/or whether the vehicle is turned off. The vehicle device may be configured with and store, in a memory, different thresholds associated with different on-off statues and different sensor types. For example, a first sensor type (e.g., accelerometer) may be associated with a first set of thresholds, and a second sensor type (e.g., gyroscope) may be associated with a second set of thresholds. When the vehicle device receives sensor data associated with a particular sensor type, the vehicle device may compare the sensor data to a particular threshold or a particular set of thresholds associated with that sensor type and associated with the on-off status of the vehicle. Based on the comparison between the sensor data and the corresponding threshold, the vehicle device may detect the event. The different thresholds may allow the vehicle device to accurately detect the event, without mistakenly detecting false events (e.g., detecting events that do not correspond to incidents causing damage to the vehicle), and without mistakenly failing to detect an actual event that occurs.

In some implementations, the vehicle device may receive the sensor data from multiple sensors, and the vehicle device may detect the event using the sensor data received from the multiple sensors. The vehicle device may detect the event based on more than one type of sensor data that satisfies a threshold. For example, the vehicle device may detect the event based on the accelerometer data satisfying a corresponding threshold and the gyroscope data satisfying a corresponding threshold. Alternatively, the vehicle device may detect the event when one type of sensor data satisfies a threshold, even when another type of sensor data does not satisfy a threshold. For example, the vehicle device may detect the event based on the accelerometer data satisfying the corresponding threshold, even when the gyroscope data does not satisfy the corresponding threshold. The vehicle device may detect no event (e.g., may determine that an event has not occurred or may not detect an event) when different types of sensor data contradict each other. For example, the vehicle device may not detect an event (or may not trigger any action based on sensor data) when the accelerometer data satisfies the corresponding threshold but the gyroscope data does not satisfy the corresponding threshold.

In some implementations, the vehicle device may store thresholds associated with various other factors, in addition to the on-off status and sensor type. The vehicle device may store different thresholds for different levels of road noise, different levels of road vibration, different speeds of the vehicle (e.g., 0-10 miles per hour (mph), 11-20 mph, 21-30 mph, 31-40 mph, 41-50 mph, 51-60 mph, 61-70 mph, or 71-80 mph), a type of vehicle (e.g., a vehicle powered by an engine versus a vehicle powered by an electric motor, where the engine may produce more vibration than the electric motor), and/or other sounds that may occur inside the vehicle and outside the vehicle. The type of vehicle may include a make of the vehicle and/or a model of the vehicle. The type of vehicle may include any type of electric vehicle, or a specific make and model of electric vehicle. The type of vehicle may indicate a propulsion type of the vehicle (e.g., whether the vehicle is an electric-powered vehicle, a gasoline-powered vehicle, or a hybrid vehicle). Different makes and models of vehicles may be associated with different noise levels (e.g., some vehicles may have better noise suppression or less vibration as compared to other vehicles).

In some implementations, the other sounds may include music played inside the vehicle (e.g., music may produce bass that causes vibrations within the vehicle), construction noise outside of the vehicle, sounds from trains, airplanes or buses outside of the vehicle, and/or sounds from horns outside of the vehicle. The vehicle device may identify an appropriate threshold associated with the on-off status of the vehicle, the sensor type associated with the sensor data that is being evaluated, the speed of the vehicle, and/or the road noise associated with the vehicle, and the vehicle device may evaluate sensor data by comparing the sensor data to the appropriate threshold. Depending on whether the sensor data satisfies the appropriate threshold, the vehicle device may detect the event.

In some implementations, multiple thresholds may be available when the vehicle is on, depending on the vehicle speed. For example, if the vehicle is stationary but powered on, the vehicle device may use a first threshold. If the vehicle is moving slowly (e.g., above a first speed threshold, like zero, and below a second speed threshold), the vehicle device may use a second threshold. If the vehicle is moving quickly (e.g., above the second speed threshold), the vehicle device may use a third threshold. The vehicle device may use a fourth threshold if the vehicle is off. Different thresholds may be set because factors such as noise, vibration, and/or temperature may increase as the vehicle moves faster. In some implementations, the vehicle device may use a particular threshold if the vehicle is stationary, regardless of whether the vehicle is on or off. The vehicle device may use one threshold if the vehicle is stationary and off, and another threshold if the vehicle is stationary and on, since there may be different noise and vibration levels when the vehicle is on versus off, even when stationary. In some implementations, the vehicle device may use set threshold values depending on a range associated with the vehicle speed, or the vehicle device may use a threshold that is a function of the vehicle speed. For example, instead of a 40 decibel (dB) noise value when the vehicle is stationary, a 50 dB noise value when the vehicle is moving less than 40 mph, and a 60 dB noise value when the vehicle is moving faster than 40 mph, a threshold dB may be a function of the vehicle speed. The threshold dB may be a vehicle speed multiplied by a constant value.

In some implementations, the vehicle device may receive different threshold values from the server. The different threshold values may be based on a combination of the on-off status, the sensor type, the vehicle speed, and/or the vehicle make/model. In some implementations, the vehicle device may determine data or receive data from the vehicle (e.g., an engine control unit) that indicates the vehicle make/model. The vehicle device may transmit an indication of the vehicle make/model to the server. The server may look up corresponding threshold values based on the vehicle make/model, and the server may indicate the corresponding threshold values to the vehicle device.

In some implementations, different thresholds may be used depending on the on-off status of the vehicle. For example, for accelerometer data that indicates vibrational changes, when the vehicle is turned on and/or moving, the vehicle itself (e.g., due to an engine or motor of the vehicle) may produce a certain amount of vibration. The vibration produced may be a baseline noise. The vibration may not be produced when the vehicle is turned off and/or not moving. In other words, the vehicle may produce no vibrational interference or minimal vibrational interference when the vehicle is turned off and/or not moving. The thresholds may be adjusted to account for the baseline noise.

In some implementations, the sensor may be the accelerometer (and/or a vibration sensor) that detects the vibrational changes associated with the vehicle. The vibrational changes may be associated with the exterior of the vehicle and/or the interior of the vehicle. The sensor data may be the accelerometer data (or vibration data) indicating the vibrational changes associated with the vehicle. The sensor type may correspond to the accelerometer. The threshold may be a first threshold associated with the on-off status indicating that the vehicle is turned on and that the sensor type corresponds to the accelerometer. The threshold may be a second threshold associated with the on-off status indicating that the vehicle is turned off and that the sensor type corresponds to the accelerometer. The first threshold may be greater than the second threshold because the vehicle may experience a greater amount of baseline noise when the vehicle is turned on versus when the vehicle is turned off. Other thresholds may be defined for the accelerometer data for different levels of vehicle speed, road noise, and/or vehicle type.

In some implementations, the accelerometer may sense vibrational changes associated with the vehicle. A low sensitivity mode may correspond to when the vehicle is moving. When the vehicle is in motion, a sensor sensitivity may decrease, such that only intense vibrational changes may be detected or may trigger detection of an event. A vibration caused by the vehicle in motion may correspond to the baseline noise. A high sensitivity mode may correspond to when the vehicle is parked. When the vehicle is parked, the sensor sensitivity may increase since relatively small vibrational changes may be detected. The vehicle that is parked may emit no vibrational interference.

In some implementations, the sensor may be the gyroscope that detects angular velocity (or rotational changes) associated with the vehicle. The angular velocity changes may be associated with the vehicle as a whole. The sensor data may be the angular velocity data indicating the angular velocity changes associated with the vehicle. The sensor type may correspond to the gyroscope. The threshold may be a first threshold associated with the on-off status indicating that the vehicle is turned on and that the sensor type corresponds to the gyroscope. The threshold may be a second threshold associated with the on-off status indicating that the vehicle is turned off and that the sensor type corresponds to the gyroscope. The first threshold may be different than the second threshold because the vehicle may undergo changes in angular velocity (e.g., due to a collision with another vehicle) when the vehicle is turned off that are different than when the vehicle is turned on. In other words, depending on whether the vehicle is moving or whether the vehicle is parked and stationary, changes in angular velocity (e.g., due to collisions) may vary. Other thresholds may be defined for the gyroscope data for different levels of vehicle speed, road noise, and/or vehicle type.

In some implementations, the sensor may be the temperature sensor that detects temperature changes associated with the vehicle. The temperature changes may be associated with the interior of the vehicle and/or the exterior of the vehicle. The sensor data may be the temperature data indicating the temperature changes associated with the vehicle. The sensor type may correspond to the temperature sensor. Thresholds for the temperature sensor may or may not depend on the on-off status of the vehicle. Other thresholds may be defined for the temperature data for different levels of vehicle speed, road noise, and/or vehicle type.

In some implementations, the sensor may be the infrared sensor or the proximity sensor that detects a presence of objects, humans, and/or animals outside of the vehicle or inside of the vehicle. The sensor data may be the infrared data or proximity data indicating the presence of objects, humans, and/or animals outside of the vehicle or inside of the vehicle. The sensor type may correspond to the infrared sensor or the proximity sensor. The threshold may be a first threshold associated with the on-off status indicating that the vehicle is turned on and that the sensor type corresponds to the infrared sensor or the proximity sensor. The threshold may be a second threshold associated with the on-off status indicating that the vehicle is turned off and that the sensor type corresponds to the infrared sensor or the proximity sensor. The first threshold may be different than the second threshold because a moving vehicle may detect a number of objects and/or persons that are in proximity to the vehicle but do not necessarily result in the event. The first threshold and the second threshold may be configured differently so that the vehicle does not mistakenly detect events when the vehicle is moving. Other thresholds may be defined for the infrared data or the proximity data for different levels of vehicle speed, road noise, and/or vehicle type.

In some implementations, the sensor may be the motion sensor that detects motion outside of the vehicle or inside of the vehicle. The sensor data may be the motion data indicating the motion outside of the vehicle or inside of the vehicle. The sensor type may correspond to the motion sensor. The threshold may be a first threshold associated with the on-off status indicating that the vehicle is turned on and that the sensor type corresponds to the motion sensor. The threshold may be a second threshold associated with the on-off status indicating that the vehicle is turned off and that the sensor type corresponds to the motion sensor. The first threshold may be different than the second threshold because a moving vehicle may detect a number of motions (e.g., due to other vehicles and pedestrians) that do not necessarily result in the event. The first threshold and the second threshold may be configured differently so that the vehicle does not mistakenly detect events when the vehicle is moving. Other thresholds may be defined for the motion data for different levels of vehicle speed, road noise, and/or vehicle type.

In some implementations, the sensor may be the microphone that detects changes in noise outside of the vehicle or inside of the vehicle. The sensor data may be the microphone data indicating the changes in noise outside of the vehicle or inside of the vehicle. The sensor type may correspond to the microphone. The threshold may be a first threshold associated with the on-off status indicating that the vehicle is turned on and that the sensor type corresponds to the microphone. The threshold may be a second threshold associated with the on-off status indicating that the vehicle is turned off and that the sensor type corresponds to the microphone. The first threshold may be different than the second threshold because a moving vehicle may encounter different noises at different decibel levels as compared to a non-moving vehicle. Other thresholds may be defined for the microphone data for different levels of vehicle speed, road noise, and/or vehicle type.

In some implementations, the vehicle device may store, in the memory, a number of sound clips or audio footprints (e.g., audio patterns or an indication of characteristics of a particular sound, such as frequency, pitch, and/or amplitude patterns) corresponding to different events. For example, the vehicle may store a first sound clip or a first audio footprint corresponding to a sound of a window breaking, a second sound clip or a second audio footprint corresponding to a sound of tire screeching, and a third sound clip or a third audio footprint corresponding to a sound of a vehicle collision. The vehicle device may compare microphone data received from the microphone to the number of sound clips and/or audio footprints, and based on a match, the vehicle device may detect the event.

In some implementations, the sensor may be the chemical sensor that detects smells outside of the vehicle or inside of the vehicle. The sensor data may be the chemical data indicating the smells outside of the vehicle or inside of the vehicle. The sensor type may correspond to the chemical sensor. Thresholds for the chemical sensor may or may not depend on the on-off status of the vehicle. Other thresholds may be defined for the chemical data for different levels of vehicle speed, road noise, and/or vehicle type.

A chemical sensor (or smell sensor) may detect odor molecules emitted from the vehicle, a person associated with the vehicle, and/or objects in proximity to the vehicle (e.g., another vehicle involved in a collision). The odor molecules may be associated with a smell. The chemical sensor may detect levels of emitted chemicals, such as sulfur, ammonia, and/or volatile elements. The chemical sensor may be a complementary metal oxide semiconductor (CMOS) sensor, a charge-coupled device (CCD) sensor, a negative channel metal oxide semiconductor (NMOS) sensor, or another suitable type of sensor capable of detecting smells associated with the vehicle. The chemical sensor may detect the smell and generate signals based on the smells.

In some implementations, the vehicle device may store, in the memory, a number of smell profiles corresponding to different events. For example, the vehicle may store a first smell profile corresponding to a smell associated with a gas leak, and a second smell profile corresponding to a smell associated with burning tire rubber. The vehicle device may compare chemical data (e.g., signals) received from the chemical sensor to the number of smell profiles, and based on a match, the vehicle device may detect the event.

In some implementations, the vehicle device may detect a type of event (or event type) associated with the event. The vehicle device may determine the type of event based on the sensor data, the on-off status of the vehicle, the sensor type, and/or a location of the sensor that provides the sensor data. The type of event may be the vehicle collision, the vehicle break-in, or vehicle vandalism. The vehicle collision may be a collision involving only the vehicle, or a collision involving the vehicle and one or more other vehicles. The vehicle break-in may involve a person forcefully entering the vehicle by causing damage to the vehicle (e.g., breaking a window to access objects within the vehicle). Vehicle vandalism may involve actions that cause damage to the vehicle, such as scratching or keying the vehicle, striking the vehicle with a door of another vehicle, striking the vehicle with an object (e.g., a baseball bat or golf club), and/or throwing objects at the vehicle.

In some implementations, the vehicle device may maintain a listing of types of sensor data (e.g., accelerometer data, gyroscope data, temperature data, infrared data, proximity data, motion data, microphone data, and/or chemical data) that, when satisfying a corresponding threshold depending on the on-off status of the vehicle, may indicate a potential type of event. For example, accelerometer data that satisfies a threshold may potentially result in a vehicle collision, a vehicle break-in, or vehicle vandalism. Gyroscope data that satisfies a threshold may potentially result in a vehicle collision. Temperature data that satisfies a threshold may potentially result in a vehicle collision or vehicle vandalism (e.g., due to a fire). Infrared data, proximity data, or motion data that satisfies a threshold may potentially result in a vehicle break-in or vehicle vandalism. Microphone data that satisfies a threshold may potentially result in a vehicle collision, a vehicle break-in, or vehicle vandalism. Chemical data that satisfies a data may potentially result in a vehicle collision. The vehicle device may consider sensor data from multiple types of sensors to determine the type of event.

In some implementations, the vehicle device may use values (e.g., numerical values) associated with the sensor data, in addition to the sensor type, when determining the type of event. For example, accelerometer data having values within a first range may correspond to a vehicle break-in or vehicle vandalism, whereas accelerometer data having values within a second range may correspond to a vehicle collision. The second range may be greater than the first range due to the greater vibrational change associated with the vehicle collision as compared to the vehicle break-in or vehicle vandalism. The vehicle device may maintain a listing of value ranges and corresponding event types. As another example, gyroscope data having values within a first range may correspond to a minor vehicle collision, whereas gyroscope data having values within a second range may correspond to a major vehicle collision. The vehicle device may determine an event severity level based on the values associated with the sensor data. For example, the vehicle device may determine a first severity level associated with the minor vehicle collision, or a second severity level associated with the major vehicle collision, where a higher severity level may correspond to a more serious event (e.g., a life threatening event or an event that causes significant damage to the vehicle in terms of monetary value).

In some implementations, the vehicle device may use an amount of time during which sensor data satisfies a threshold when determining the type of event. For example, infrared data, proximity data, or motion data that indicates a presence of an object or person in proximity to the vehicle for a threshold amount of time (e.g., 5 minutes) may indicate a potential vehicle break-in or vehicle vandalism. In other words, sensor data may satisfy a threshold for a relatively brief period of time (e.g., accelerometer data may satisfy the threshold for a few seconds corresponding to a vehicle collision, but subsequent accelerometer data may no longer satisfy the threshold), or the sensor data may satisfy a threshold for a relatively long period of time. The amount of time during which the sensor data satisfies a threshold may be considered when determining the type of event.

In some implementations, the vehicle device may use the location of the sensor providing the sensor data that satisfies a threshold when detecting the event. The location of the sensor may be relative to the vehicle, such as a driver side door, a driver side window, a passenger side door, or a passenger side window. For example, a sensor located in proximity to a window that provides sensor data that satisfies a threshold may be more likely to correspond to a vehicle break-in. A sensor located at a front of the vehicle, a back of the vehicle, or a side of the vehicle that provides sensor data that satisfies a threshold may be more likely to correspond to a vehicle collision. Different sensor locations providing sensor data that satisfies a threshold may correspond to an increased likelihood of the type of event being one of the vehicle collision, the vehicle break-in, or vehicle vandalism.

In some implementations, the vehicle device may determine a region of the vehicle associated with the event. The vehicle device may determine the region of the vehicle based on a location of the sensor, relative to the vehicle, that provides the sensor data used to detect the event. For example, a first sensor associated with a driver side door may send sensor data satisfying a threshold, whereas a second sensor associated with a passenger side door may send sensor data that does not satisfy the threshold. The vehicle device may determine, based on the sensor data received from the first sensor and the sensor data received from the second sensor, that the event is associated with the driver side door and not the passenger side door.

As shown by reference number 106, the vehicle device may activate the camera to capture video data of the scene associated with the vehicle based on detecting the event. The camera may be configured to capture video data on-demand, so based on the event detection, the vehicle device may signal to the capture to start capturing the video data of the scene associated with the vehicle. The vehicle device may activate all cameras of the vehicle as a default setting. Alternatively, the vehicle device may activate a subset of the cameras of the vehicle, depending on the type of event and/or the region of the vehicle associated with the event. For example, for an event that is detected to occur towards a front of the vehicle, the vehicle device may activate only a front camera of the vehicle. Because the camera may only capture the video data on-demand, video data corresponding to the scene prior to the event detection may not be available.

In some implementations, the vehicle device may activate the camera to capture the video data of the scene for a duration of time. The duration of time may correspond to a time period during which the event actually occurs and a time period after the event occurs. During the time period in which the event actually occurs, the sensor data may satisfy the threshold. During the time period after the event, the sensor data may not necessarily satisfy the threshold.

In some implementations, the camera that is activated may detect moving objects (e.g., fleeing perpetrators or a vehicle speeding away). The camera may be able to rotate or otherwise move to capture video data of the moving objects. In other words, the cameras may rotate accordingly to follow the moving objects until the moving objects are outside a field of view of the camera. The camera may be able to increase a zoom level in an attempt to capture additional features associated with the moving objects (e.g., a face of a person, or a license plate number).

In some implementations, the vehicle device may determine the duration of time, which may include the time period after the event occurs, based on the type of event. Different types of events may be associated with preset durations of time. For example, vehicle break-ins and vehicle vandalism may be associated with relatively short durations of time, since perpetrators are more likely to quickly cause damage and leave the scene to avoid apprehension. Vehicle collisions may involve a longer durations of time, even though the actual collision may only take a few seconds, since parties involved in the vehicle collision may assess the damage, exchange insurance information, and/or wait for law enforcement or medical personnel to arrive at the scene. Capturing video data of this entire process may be valuable to parties involved in the vehicle collision. The vehicle device may determine the duration of time based on the event severity level, where a higher severity level may correspond to a longer duration of time and a lower severity level may correspond to a shorter duration of time.

In some implementations, the vehicle device may receive additional sensor data from the sensor that initially provided the sensor data leading to the event detection and/or from other sensors of the vehicle. The vehicle device may compare the additional sensor data to appropriate thresholds, and based on the comparison, the vehicle device may detect no event. In other words, the vehicle device may determine that the event has concluded or is no longer occurring. The vehicle device may instruct the camera to continue capturing video data based on the duration of time determined by the vehicle device. For example, the vehicle device may instruct the camera to capture five additional minutes of video data after the event is over to ensure that the event is sufficiently captured. The vehicle device may deactivate the camera after the duration of time is over or has expired. The vehicle device may signal to the camera to stop capturing video data of the scene associated with the vehicle.

As an example, infrared data, proximity data, and/or motion data may indicate a presence of objects, humans, and/or animals outside of the vehicle or inside of the vehicle. Over a period of time (e.g., 10 minutes), the vehicle device may continually or periodically compare the infrared data, proximity data, and/or motion data to appropriate thresholds, and based on the comparison, the vehicle device may determine that the event is still ongoing. When the vehicle device determines that the infrared data, proximity data, and/or motion data no longer satisfy the appropriate thresholds, the vehicle device may determine that the event has concluded. After an additional period of time based on the type of event, the vehicle device may trigger the camera to stop recording the scene associated with the vehicle.

In some implementations, the vehicle device may accurately determine the duration of time associated with the event, which may allow the camera to capture video data related to the event but without capturing excess video data that is less likely to be related to the event. The vehicle device may be able to determine when the camera should stop capturing the video data based on the determined duration of time, which may save resources at the camera.

The vehicle device may consume less resources since the vehicle device may process and transmit video data having a smaller file size.

As shown in FIG. 1B, and by reference number 108, the vehicle device may transmit an indication of the event and/or the video data to the mobile device of a user associated with the vehicle. The indication may indicate the event type and/or the region of the vehicle associated with the event. When the vehicle is turned on and moving, the indication may not indicate the event type and/or the region of the vehicle, since the user is presumably in the vehicle. When the vehicle is turned off, the indication may indicate the event type and/or the region of the vehicle since the user is presumably not in the vehicle.

As shown by reference number 110, the vehicle device may transmit, to the server, the video data associated with the event. The video data may be of the scene associated with the vehicle. The video data may correspond to the duration of time, as determined by the vehicle device.

As shown by reference number 112, the server may perform video processing on the video data to identify objects from the video data. The server may use computer vision, such as pattern recognition, object detection, object recognition, and/or related techniques, to identify the objects from the video data that are associated with the event. The objects may correspond to a person or multiple persons associated with the event, another vehicle associated with the event, a license plate associated with the event, a building associated with the event, and/or signage associated with the event.

In some implementations, the server may generate an event report. The event report may be an electronic report that includes the video data or portions of the video. The event report may indicate various objects detected in the video data, such as persons, other vehicles, license plates, buildings, and/or signs (e.g., street signs or business signs). The event report may indicate the objects and tags associated with the objects, where the tags may indicate a description or category associated with each of the objects. The server may conveniently gather important features of the video data (e.g., images of faces of persons involved in the event, and/or license plate information of other vehicles involved in the event), and include such information in the event report.

As shown by reference number 114, the server may transmit the event report to the mobile device, which may allow the user associated with the vehicle to view the event report. The server may also transmit the event report to other external systems, such as an insurance system and/or a law enforcement system. The insurance system may use the event report when processing insurance claims associated with the event. The insurance claims may be related to a vehicle collision, a vehicle break-in, or vehicle vandalism. The event report may provide sufficient evidence that the event occurred and an extent of damage caused by the event. The law enforcement system may use the event report to perform law enforcement actions associated with the event. For example, the law enforcement system may lookup license plate information in a database to identify a perpetrator associated with the event, and/or the law enforcement system may apply facial recognition software to an image of the perpetrator to determine an identity of the perpetrator.

In some implementations, the event report may provide curated video data of the event, which may allow third parties to conveniently learn key features associated with the event (e.g., persons involved in the event, and/or other vehicles involved in the event). The event report may be useful for vehicle collisions, including hit and run incidents and/or incidents in which no witnesses are present. The event report may negate misinformation of involved parties. The event report may provide video evidence for insurance claims when animals or manmade structures are involved. The event report may be useful for thefts in identifying burglars. The event report may be useful for vehicle vandalism in identifying vandals.

As indicated above, FIGS. 1A-1B are provided as an example. Other examples may differ from what is described with regard to FIGS. 1A-1B.

Figure 2A:
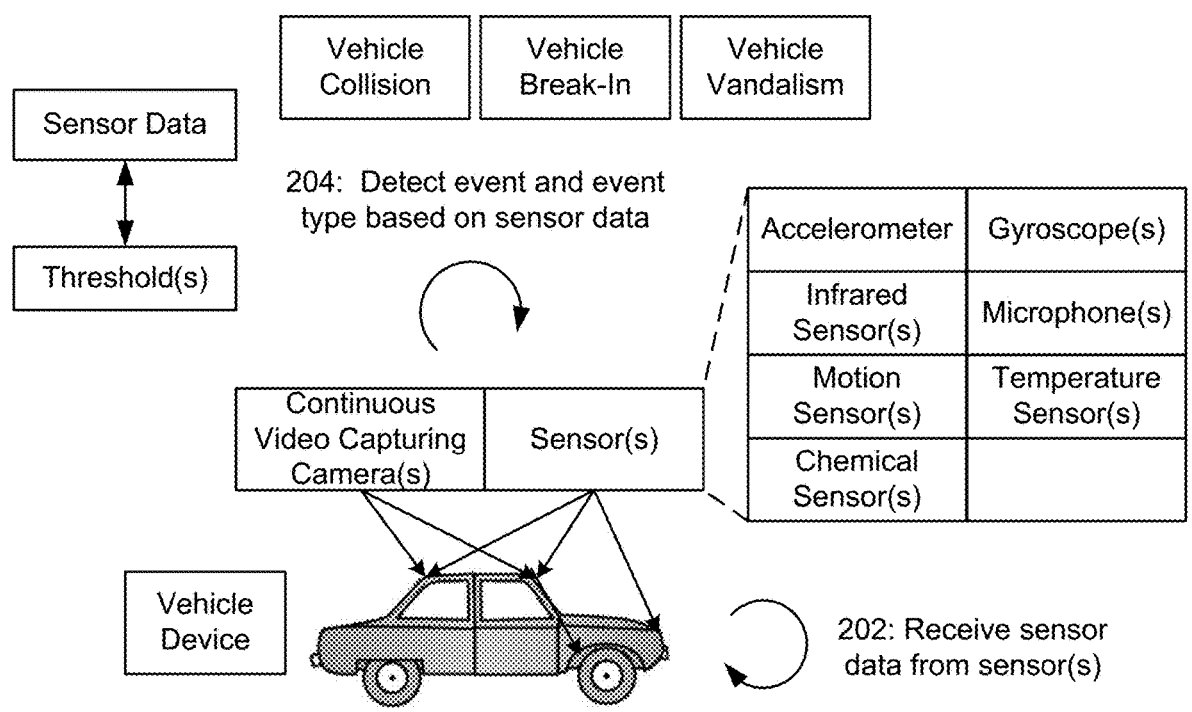
FIGS. 2A-2B are diagrams illustrating an example associated with capturing video data of events associated with vehicles using a continuous video capturing camera.
Figure 2B:
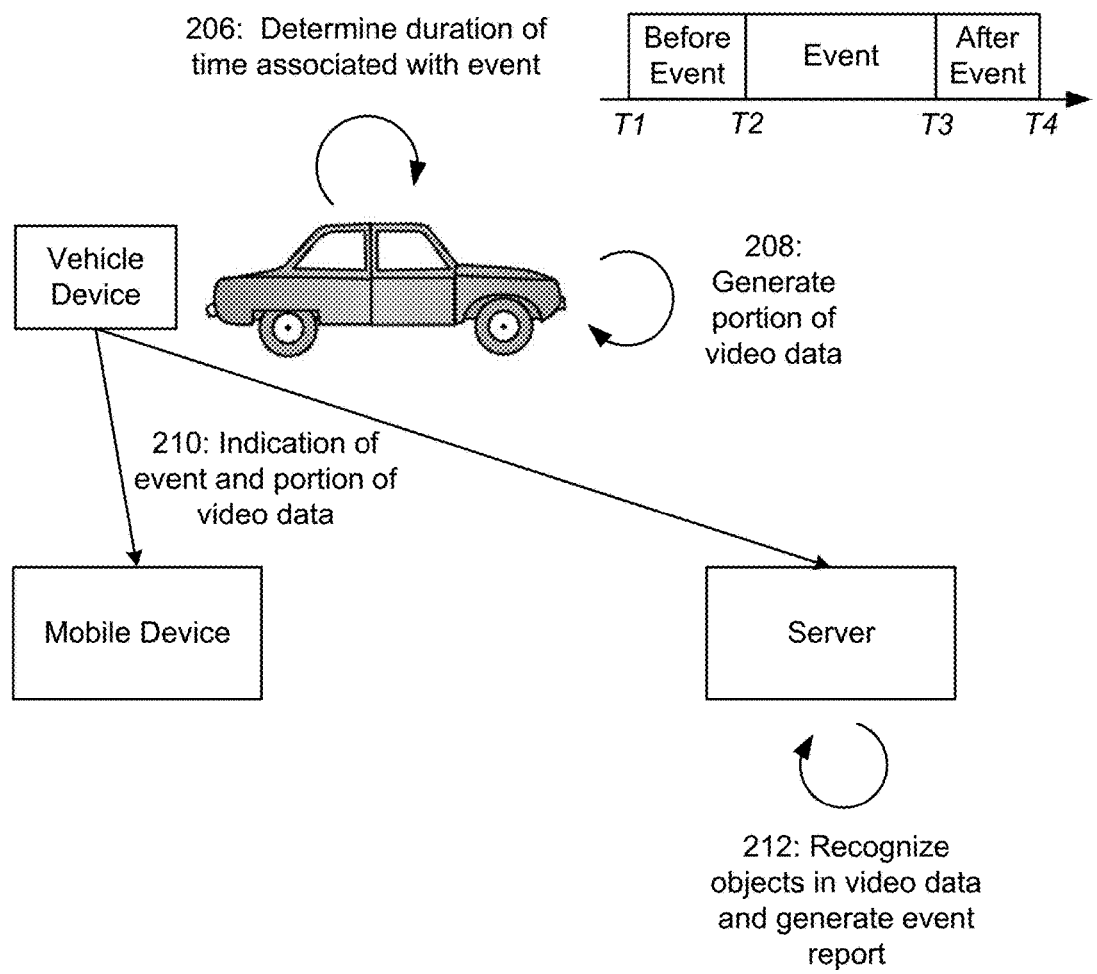

FIGS. 2A-2B are diagrams of an example 200 related to capturing video data of events associated with vehicles using a continuous video capturing camera. As shown in FIGS. 2A-2B, example 200 includes a vehicle device, a mobile device, and a server. These devices are described in more detail in connection with FIGS. 3 and 4.

In some implementations, the vehicle device may be associated with one or more cameras that are able to continuously capture video data of a scene associated with a vehicle. A camera may continuously capture video data irrespective of whether the vehicle is turned on and stationary, the vehicle is turned on and moving, or the vehicle is turned off. When the vehicle is turned on, a power source of the vehicle may provide power to the camera and/or charge a rechargeable battery of the camera. When the vehicle is turned off, the camera may operate using power from the rechargeable battery. The camera may be capable to storing a certain amount of video data (e.g., up to 6 hours of video data). As the camera records new video data, older video data may be erased from a memory associated with the camera.

As shown in FIG. 2A, and by reference numbers 202 and 204, the vehicle device may receive sensor data from one or more sensors of the vehicle and detect an event and a type of event based on the sensor data, in a similar manner as described above in connection with FIG. 1A.

As shown in FIG. 2B, and by reference number 206, the vehicle device may determine a duration of time associated with the event. The vehicle device may determine the duration of time based on the sensor data and the type of event. The duration of time associated with the event may include a first time period prior to an occurrence of the event (e.g., T1 to T2), a second time period corresponding to an actual occurrence of the event (e.g., T2 to T3), and a third time period after the event occurs (e.g., T3 to T4). Because the camera is continuously capturing video data, the camera may have captured video data of the scene prior to the event occurring.

In some implementations, the vehicle device may determine a start of the event (e.g., T2) based on detecting the event, where the event may be detected based on the sensor data as described elsewhere herein. The vehicle device may determine an end of the event (e.g., T3) based on the sensor data. The vehicle device may determine when the sensor data no longer satisfies a threshold, which may correspond to the end of the event, as described elsewhere herein. In other words, a time duration in which the sensor data continues to satisfy the threshold may correspond to the second time period.

In some implementations, the vehicle device may determine the first time period prior to the event and the third time period after the event occurs based on the type of event. Different types of events may be associated with preset durations of time before the event occurs and after the event occurs. In other words, a specific type of event may be associated with a first preset duration of time for before the event occurs and a second preset duration of time for after the event occurs.

For example, vehicle break-ins and vehicle vandalism may be associated with relatively long durations of time before the event occurs (e.g., 20 minutes) since a perpetrator may often walk by the vehicle a few times to determine whether the vehicle is a strong target. Vehicle break-ins and vehicle vandalism may be associated with relatively short durations of time after the event occurs (e.g., 2 minutes) since perpetrators are often likely to quickly leave the scene to avoid apprehension.

As another example, vehicle collisions may be associated with relatively short durations of time before the event occurs (e.g., two minutes) since vehicle collisions often happen suddenly. A first vehicle that is driving straight on a road may continuously be capturing video data of a scene associated with the first vehicle, and a second vehicle may be ahead on a perpendicular street waiting to make a turn onto the road associated with the first vehicle. The second vehicle may make the turn without seeing the first vehicle and the first vehicle may hit the second vehicle. In this example, a time duration of video data that would show the second vehicle making the turn without seeing the first vehicle and crashing into the first vehicle may be a relatively short duration of time. Further, vehicle collisions may be associated with relatively long durations of time after the event occurs (e.g., 20 minutes) since parties involved in the vehicle collision may assess the damage, exchange insurance information, and/or wait for law enforcement or medical personnel to arrive at the scene.

In some implementations, video data captured by the camera during the first time period and the third time period may be useful to learn information about perpetrators involved in the event. For example, during a vehicle break-in or vehicle vandalism, the camera may capture video data of a perpetrator walking up to the vehicle and preparing to break into the vehicle or preparing to vandalize the vehicle. The camera may capture video data of the perpetrator walking away from the vehicle after the vehicle break-in or vehicle vandalism occurs. During the first time period and the third time period, the sensor data may not satisfy a threshold.

In some implementations, the vehicle device may determine the first time period and the third time period based on an event severity level, where a higher severity level may correspond to a longer duration of time for the first time period and/or the third time period and a lower severity level may correspond to a shorter duration of time for the first time period and/or the third time period. Since the camera may continuously capture video data and may have adequate storage capacity, the vehicle device may include video data from before the first time period and/or video data after the third time period to ensure that all relevant video associated with the event is saved.

In some implementations, since the camera may continuously capture video data, an ability to accurate determine the duration of time that corresponds to the event may be useful to avoid processing unnecessarily long video data files. Such video data files may include video data that is not related to the event. Rather than setting recording time periods before the event occurs and after the event occurs according to preset values, which may unnecessarily lengthen the video data file or may be insufficient to capture all relevant information associated with the event, the vehicle device may determine the duration of time based on the type of event and/or the event severity level.

As shown by reference number 208, the vehicle device may generate a portion of video data based on the duration of time associated with the event. The portion of video data may be derived from a larger video data file stored in a memory. For example, the vehicle device may generate a 15 minute portion of video data based on the duration of time associated with the event, where the 15 minute portion of video data may be derived from a 6 hour long video data file. The portion of video data may include the first time period prior to the occurrence of the event, the second time period corresponding to the actual occurrence of the event (e.g., during which sensor data may satisfy the threshold, and the third time period after the event occurs.

As shown by reference number 210, the vehicle device may transmit, to the mobile device of a user associated with the vehicle and the server, an indication of the event and/or the portion of video data to, in a similar manner as described above in connection with FIG. 1B.

As shown by reference number 212, the server may recognize objects in the video data, generate an event report, and transmit the event report to an insurance system and/or a law enforcement system, in a similar manner as described above in connection with FIG. 1B.

As indicated above, FIGS. 2A-2B are provided as an example. Other examples may differ from what is described with regard to FIGS. 2A-2B.

Figure 3:
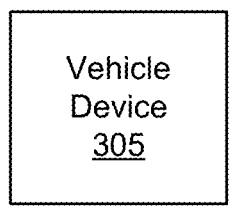
FIG. 3 is a diagram of an example environment in which systems and/or methods described herein may be implemented.
Figure 3:
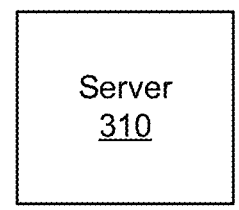
Figure 3:
Figure 3:
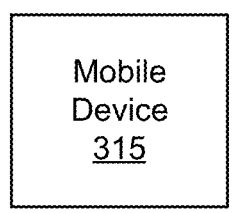
Figure 3:
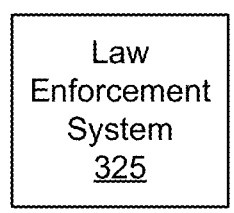
Figure 3:
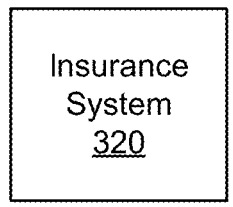

FIG. 3 is a diagram of an example environment 300 in which systems and/or methods described herein may be implemented. As shown in FIG. 3, environment 300 may include a vehicle device 305, a server 310, a mobile device 315, an insurance system 320, a law enforcement system 325, and a network 330. Devices of environment 300 may interconnect via wired connections, wireless connections, or a combination of wired and wireless connections.

A vehicle device 305 includes one or more devices capable of receiving, generating, storing, processing, and/or providing information associated with capturing video data of events associated with vehicles, as described elsewhere herein. The vehicle device 305 may include a communication device and/or a computing device. The vehicle device 305 may be a standalone device that is connected to a vehicle and provides functionalities associated with capturing video data of events associated with the vehicle. Alternatively, the vehicle device 305 may be integrated with the device (e.g., installed during a manufacturing of the vehicle).

The server 310 includes one or more devices capable of receiving, generating, storing, processing, providing, and/or routing information associated with capturing video data of events associated with vehicles, as described elsewhere herein. The server 310 may include a communication device and/or a computing device. For example, the server 310 may include a server, such as an application server, a client server, a web server, a database server, a host server, a proxy server, a virtual server (e.g., executing on computing hardware), or a server in a cloud computing system. In some implementations, the server 310 includes computing hardware used in a cloud computing environment.

The mobile device 315 includes one or more devices capable of receiving, generating, storing, processing, and/or providing information associated with capturing video data of events associated with vehicles, as described elsewhere herein. The mobile device 315 may include a communication device and/or a computing device. For example, the mobile device 315 may include a wireless communication device, a phone such as a smart phone, a mobile phone or a video phone, a user equipment, or a similar type of device.

The insurance system 320 includes one or more devices capable of receiving, generating, storing, processing, providing, and/or routing information associated with capturing video data of events associated with vehicles, as described elsewhere herein. The insurance system 320 may include a communication device and/or a computing device. For example, the insurance system 320 may include a server, such as an application server, a client server, a web server, a database server, a host server, a proxy server, a virtual server (e.g., executing on computing hardware), or a server in a cloud computing system. Additionally, or alternatively, the insurance system 320 may include a phone (e.g., as a smart phone, a mobile phone or a video phone), a user equipment, a laptop computer, a tablet computer, a desktop computer, or a similar type of device. In some implementations, the insurance system 320 includes computing hardware used in a cloud computing environment.

The law enforcement system 325 includes one or more devices capable of receiving, generating, storing, processing, providing, and/or routing information associated with capturing video data of events associated with vehicles, as described elsewhere herein. The law enforcement system 325 may include a communication device and/or a computing device. For example, the law enforcement system 325 may include a server, such as an application server, a client server, a web server, a database server, a host server, a proxy server, a virtual server (e.g., executing on computing hardware), or a server in a cloud computing system. Additionally, or alternatively, the law enforcement system 325 may include a phone (e.g., as a smart phone, a mobile phone or a video phone), a user equipment, a laptop computer, a tablet computer, a desktop computer, or a similar type of device. In some implementations, the law enforcement system 325 includes computing hardware used in a cloud computing environment.

The network 330 includes one or more wired and/or wireless networks. For example, the network 330 may include a cellular network, a public land mobile network, a local area network, a wide area network, a metropolitan area network, a telephone network, a private network, the Internet, and/or a combination of these or other types of networks. The network 330 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
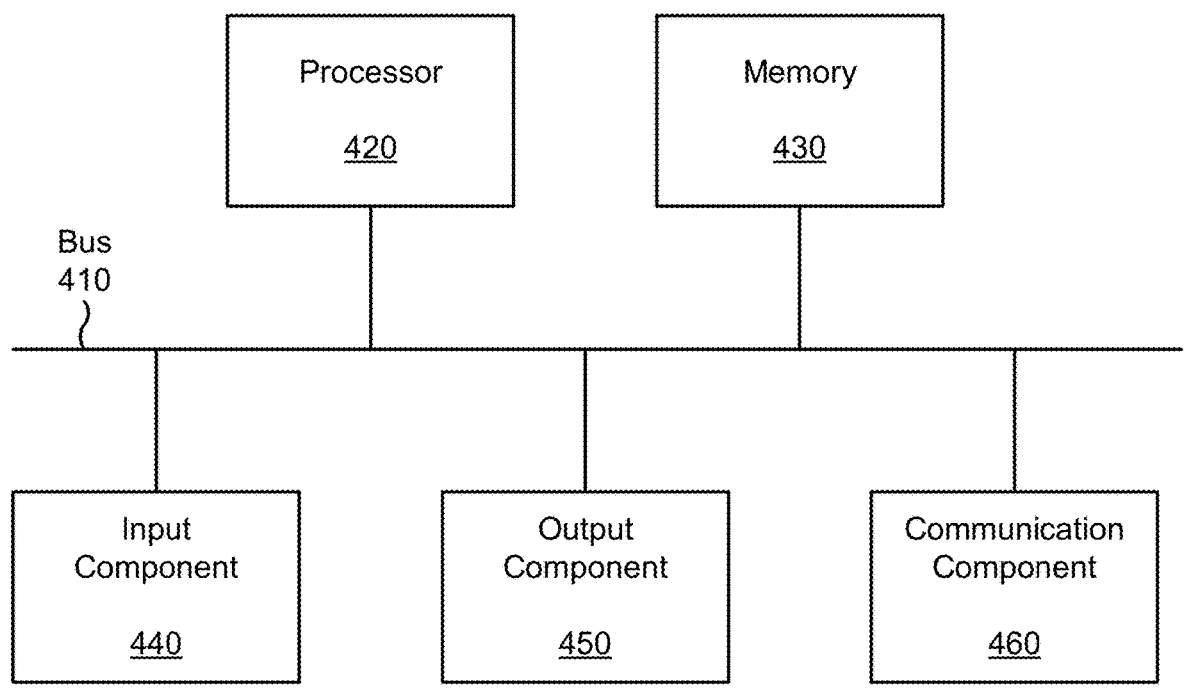
FIG. 4 is a diagram of example components of one or more devices of FIG. 4.

FIG. 4 is a diagram of example components of a device 400, which may correspond to vehicle device 305, server 310, mobile device 315, insurance system 320, and/or law enforcement system 325. In some implementations, vehicle device 305, server 310, mobile device 315, insurance system 320, and/or law enforcement system 325 include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
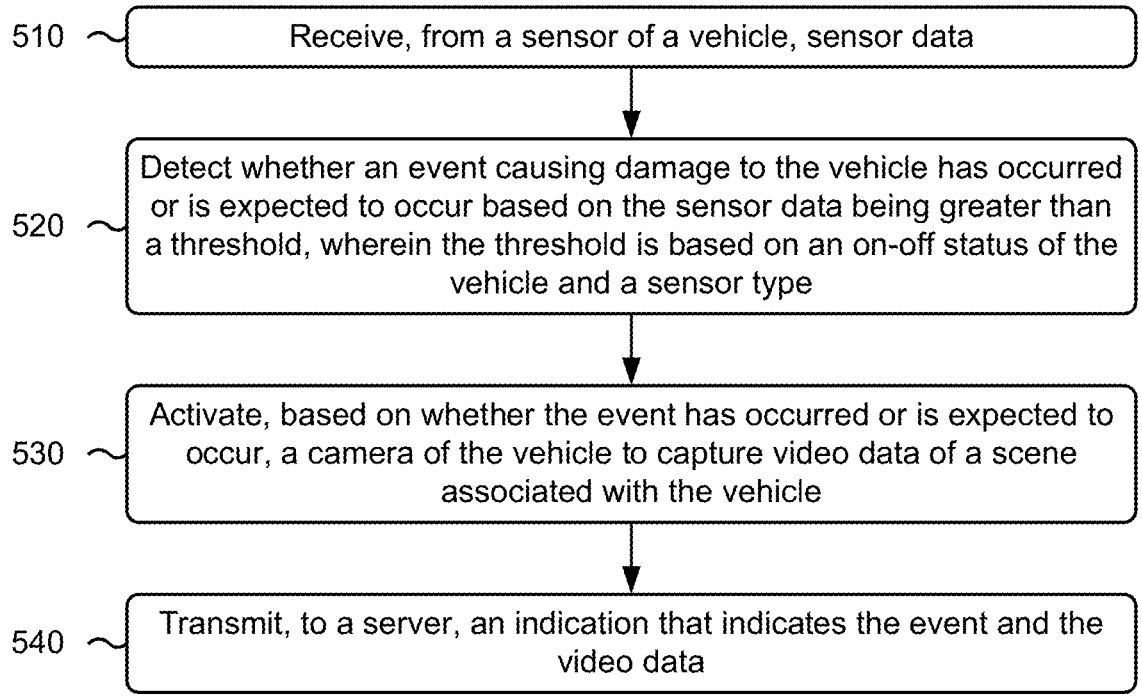
FIGS. 5-6 are flowcharts of example processes relating to capturing video data of events associated with vehicles.

FIG. 5 is a flowchart of an example method 500 associated with capturing video data of events associated with vehicles. In some implementations, one or more process blocks of FIG. 5 may be performed by a vehicle device (e.g., vehicle device 305). In some implementations, one or more process blocks of FIG. 5 may be performed by another device or a group of devices separate from or including the vehicle device, such as server 310. Additionally, or alternatively, one or more process blocks of FIG. 5 may be performed by one or more components of device 400, such as processor 420, memory 430, input component 440, output component 450, and/or communication component 460.

As shown in FIG. 5, the method 500 may include receiving, from a sensor of a vehicle, sensor data (block 510). As further shown in FIG. 5, the method 500 may include detecting whether an event causing damage to the vehicle has occurred or is expected to occur based on the sensor data being greater than a threshold, wherein the threshold is based on an on-off status of the vehicle and a sensor type (block 520). As further shown in FIG. 5, the method 500 may include activating, based on whether the event has occurred or is expected to occur, a camera of the vehicle to capture video data of a scene associated with the vehicle (block 530). As further shown in FIG. 5, the method 500 may include transmitting, to a server, an indication that indicates the event and the video data (block 540).

Although FIG. 5 shows example blocks of a method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel. The method 500 is an example of one method that may be performed by one or more devices described herein. These one or more devices may perform one or more other methods based on operations described herein, such as the operations described in connection with FIGS. 1A, 1B, 2A, and 2B.

Figure 6:
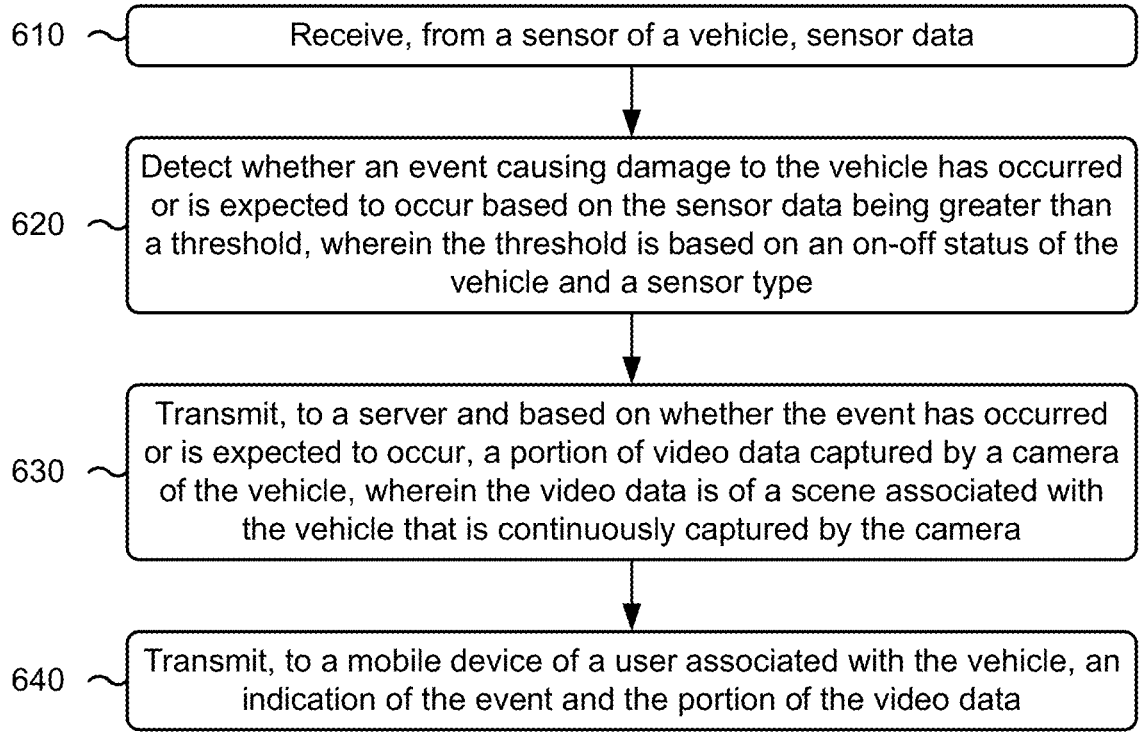

FIG. 6 is a flowchart of an example method 600 associated with capturing video data of events associated with vehicles. In some implementations, one or more process blocks of FIG. 6 may be performed by a vehicle device (e.g., vehicle device 305). In some implementations, one or more process blocks of FIG. 6 may be performed by another device or a group of devices separate from or including the vehicle device, such as server 310. Additionally, or alternatively, one or more process blocks of FIG. 6 may be performed by one or more components of device 400, such as processor 420, memory 430, input component 440, output component 450, and/or communication component 460.

As shown in FIG. 6, the method 600 may include receiving, from a sensor of a vehicle, sensor data (block 610). As further shown in FIG. 6, the method 600 may include detecting whether an event causing damage to the vehicle has occurred or is expected to occur based on the sensor data being greater than a threshold, wherein the threshold is based on an on-off status of the vehicle and a sensor type (block 620). As further shown in FIG. 6, the method 600 may include transmitting, to a server and based on whether the event has occurred or is expected to occur, a portion of video data captured by a camera of the vehicle, wherein the video data is of a scene associated with the vehicle that is continuously captured by the camera (block 630). As further shown in FIG. 6, the method 600 may include transmitting, to a mobile device of a user associated with the vehicle, an indication of the event and the portion of the video data (block 640).

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform one or more other methods based on operations described herein, such as the operations described in connection with FIGS. 1A, 1B, 2A, and 2B.

In some implementations, a device associated with a vehicle (e.g., a vehicle device) includes memory; a sensor operable to capture sensor data; a camera operable to capture video data of a scene associated with the vehicle; and one or more processors, coupled to the memory, configured to: receive the sensor data from the sensor; detect whether an event causing damage to the vehicle has occurred or is expected to occur based on the sensor data satisfying a threshold, wherein the threshold is based on an on-off status of the vehicle and a sensor type; activate, based on whether the event has occurred or is expected to occur, the camera to capture the video data of the scene associated with the vehicle; and transmit, to one or more of a server or a mobile device of a user associated with the vehicle, an indication that indicates the event and the video data.

In some implementations, a device associated with a vehicle (e.g., a vehicle device) includes memory; a sensor operable to capture sensor data; a camera operable to continuously capture video data of a scene associated with the vehicle; and one or more processors, coupled to the memory, configured to: receive the sensor data from the sensor; detect whether an event causing damage to the vehicle has occurred or is expected to occur based on the sensor data satisfying a threshold, wherein the threshold is based on an on-off status of the vehicle and a sensor type; transmit, to a server and based on whether the event has occurred or is expected to occur, a portion of the video data captured by the camera; and transmit, to a mobile device of a user associated with the vehicle, an indication of the event and the portion of the video data.

In some implementations, a method includes receiving, from a sensor of a vehicle, sensor data; detecting whether an event causing damage to the vehicle has occurred or is expected to occur based on the sensor data being greater than a threshold, wherein the threshold is based on an on-off status of the vehicle and a sensor type; activating, based on whether the event has occurred or is expected to occur, a camera of the vehicle to capture video data of a scene associated with the vehicle; and transmitting, to a server, an indication that indicates the event and the video data.

In some implementations, a method includes receiving, from a sensor of a vehicle, sensor data; detecting whether an event causing damage to the vehicle has occurred or is expected to occur based on the sensor data being greater than a threshold, wherein the threshold is based on an on-off status of the vehicle and a sensor type; transmitting, to a server and based on whether the event has occurred or is expected to occur, a portion of video data captured by a camera of the vehicle, wherein the video data is of a scene associated with the vehicle that is continuously captured by the camera; and transmitting, to a mobile device of a user associated with the vehicle, an indication of the event and the portion of the video data.

The foregoing disclosure provides illustration and description but is not intended to be exhaustive or to limit the implementations to the precise forms disclosed. Modifications and variations may be made in light of the above disclosure or may be acquired from practice of the implementations described herein.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A device associated with a vehicle, comprising:
   memory;
   a sensor operable to capture sensor data;
   an additional sensor operable to capture additional sensor data;
   a camera operable to capture video data of a scene associated with the vehicle; and
   one or more processors, coupled to the memory, configured to:
   store, in the memory:
   a set of thresholds associated with a sensor type of the sensor, wherein a first threshold of the set of thresholds is associated with an on-off status of the vehicle indicating that the vehicle is turned on and a second threshold of the set of thresholds is associated with the on-off status of the vehicle indicating that the vehicle is turned off, and
   an additional set of thresholds associated with an additional sensor type of the additional sensor, wherein a third threshold of the additional set of thresholds is associated with the on-off status of the vehicle indicating that the vehicle is turned on and a fourth threshold of the additional set of thresholds is associated with the on-off status of the vehicle indicating that the vehicle is turned off;
   receive the sensor data from the sensor;
   identify, based on the on-off status of the vehicle, a threshold of the set of thresholds to compare to the sensor data;
   detect whether an event causing damage to the vehicle has occurred or is expected to occur based on comparing the identified threshold to the sensor data;
   activate, based on whether the event has occurred or is expected to occur, the camera to capture the video data of the scene associated with the vehicle; and
   transmit, to one or more of a server or a mobile device of a user associated with the vehicle, an indication that indicates the event and the video data.

2. The device of claim 1, wherein:
   the sensor is an accelerometer operable to detect vibrational changes associated with the vehicle, wherein the vibrational changes are associated with an exterior of the vehicle or an interior of the vehicle;
   the sensor data is accelerometer data indicating the vibrational changes associated with the vehicle;
   the sensor type corresponds to the accelerometer; and
   the first threshold is greater than the second threshold.

3. The device of claim 1, wherein the one or more processors are further configured to determine a type of event based on the sensor data, the on-off status of the vehicle, and the sensor type, wherein the type of event is one of: a vehicle collision, a vehicle break-in, or vehicle vandalism.

4. The device of claim 3, wherein the one or more processors are configured to:
   activate the camera to capture the video data of the scene associated with the vehicle for a duration of time based on the type of event; and
   deactivate the camera after the duration of time is over or based on other sensor data indicating that the event is no longer occurring.

5. The device of claim 1, wherein the one or more processors are further configured to determine a region of the vehicle associated with the event based on a location of the sensor, relative to the vehicle, that captures the sensor data used to detect the event, wherein the indication indicates the region of the vehicle associated with the event.

6. The device of claim 1, wherein the sensor operable to capture the sensor data is one of:
- a gyroscope operable to detect rotational changes associated with the vehicle;
- a temperature sensor operable to detect temperatures associated with the vehicle;
- an infrared sensor operable to detect a presence of humans or animals outside of the vehicle or inside of the vehicle;
- a motion sensor operable to detect motion outside of the vehicle or inside of the vehicle;
- a microphone operable to detect a noise of the vehicle or a noise that has occurred outside of the vehicle or inside of the vehicle; or
- a chemical sensor operable to detect a smell associated with the vehicle.

7. The device of claim 1, wherein the first threshold and the third threshold account for a baseline noise level associated with the vehicle being on.

8. The device of claim 1, wherein the first threshold is associated with a first factor of a set of factors and the second threshold is associated with a second factor of the set of factors, wherein the set of factors include at least one of:
- different levels of road noise or vibration,
- different speeds of the vehicle,
- different types of vehicles, or
- sounds that occur in relation to the vehicle.

9. A device associated with a vehicle, comprising:
memory;
a sensor operable to capture sensor data;
an additional sensor operable to capture additional sensor data;
a camera operable to continuously capture video data of a scene associated with the vehicle; and
one or more processors, coupled to the memory, configured to:
store, in the memory:
a set of thresholds associated with a sensor type of the sensor, wherein a first threshold of the set of thresholds is associated with an on-off status of the vehicle indicating that the vehicle is turned on and a second threshold of the set of thresholds is associated with the on-off status of the vehicle indicating that the vehicle is turned off, and
an additional set of thresholds associated with an additional sensor type of the additional sensor, wherein a third threshold of the additional set of thresholds is associated with the on-off status of the vehicle indicating that the vehicle is turned on and a fourth threshold of the additional set of thresholds is associated with the on-off status of the vehicle indicating that the vehicle is turned off;
receive the sensor data from the sensor;
identify, based on the on-off status of the vehicle, a threshold of the set of thresholds to compare to the sensor data;
detect whether an event causing damage to the vehicle has occurred or is expected to occur based on comparing the identified threshold to the sensor data;
transmit, to a server and based on whether the event has occurred or is expected to occur, a portion of the video data captured by the camera; and
transmit, to a mobile device of a user associated with the vehicle, an indication of the event and the portion of the video data.

10. The device of claim 9, wherein the one or more processors are further configured to determine a type of event based on at least one of: the sensor data, the on-off status of the vehicle, or the sensor type, wherein the type of event is one of: a vehicle collision, a vehicle break-in, or vehicle vandalism.

11. The device of claim 10, wherein the one or more processors are further configured to:
determine a duration of time associated with the event based on the sensor data and the type of event, wherein the duration of time includes a time period prior to the event and a time period after the event; and
generate the portion of the video data based on the duration of time associated with the event.

12. The device of claim 9, wherein:
the sensor is a gyroscope operable to detect angular velocity changes associated with the vehicle;
the sensor data is gyroscope data indicating the angular velocity changes associated with the vehicle;
the sensor type corresponds to the gyroscope; and
the first threshold is greater than the second threshold.

13. The device of claim 9, wherein the sensor operable to capture the sensor data is one of:
- a temperature sensor operable to detect temperatures associated with the vehicle;
- an infrared sensor operable to detect a presence of humans or animals outside of the vehicle or inside of the vehicle;
- a motion sensor operable to detect motion outside of the vehicle or inside of the vehicle;
- a microphone operable to detect a noise of the vehicle or a noise that has occurred outside of the vehicle or inside of the vehicle; or
- a chemical sensor operable to detect a smell associated with the vehicle.

14. The device of claim 9, wherein the identified threshold is based on one or more of: a vehicle speed, a make of the vehicle, or a model of the vehicle.

15. A method, comprising:
receiving, from a sensor of a vehicle, sensor data;
detecting whether an event causing damage to the vehicle has occurred or is expected to occur based on the sensor data being greater than an identified threshold that is based on an on-off status of the vehicle, wherein:
a set of thresholds associated with a sensor type of the sensor, wherein a first threshold of the set of thresholds is associated with the on-off status of the vehicle indicating that the vehicle is turned on and a second threshold of the set of thresholds is associated with the on-off status of the vehicle indicating that the vehicle is turned off, and
an additional set of thresholds associated with an additional sensor type of an additional sensor of the vehicle, wherein a third threshold of the additional set of thresholds is associated with the on-off status of the vehicle indicating that the vehicle is turned on and a fourth threshold of the additional set of thresholds is associated with the on-off status of the vehicle indicating that the vehicle is turned off;

activating, based on whether the event has occurred or is expected to occur, a camera of the vehicle to capture video data of a scene associated with the vehicle; and transmitting, to a server, an indication that indicates the event and the video data.

16. The method of claim 15, further comprising:

receiving, from the server, an event report that indicates one or more of: a person associated with the event, another vehicle associated with the event, a license plate associated with the event, a building associated with the event, or signage associated with the event; and transmitting the event report to a mobile device of a user associated with the vehicle.

17. The method of claim 15, wherein:

the sensor data is accelerometer data indicating vibrational changes associated with the vehicle, wherein the vibrational changes are associated with an exterior of the vehicle or an interior of the vehicle; and the sensor type corresponds to an accelerometer.

18. The method of claim 15, further comprising:

activating the camera to capture the video data of the scene associated with the vehicle for a duration of time based on the event; and deactivating the camera after the duration of time has expired.

19. The method of claim 15, further comprising determining a region of the vehicle associated with the event based on a location of the sensor relative to the vehicle that captures the sensor data used to detect the event, wherein the indication indicates the region of the vehicle associated with the event.

20. The method of claim 15, further comprising:

transmitting, to a server, information associated with one or more of: a vehicle speed, a make of the vehicle, or a model of the vehicle; and receiving, from the server, the identified threshold based on one or more of: the vehicle speed, the make of the vehicle, or the model of the vehicle.

21. A method, comprising:

receiving, from a sensor of a vehicle, sensor data;

detecting whether an event causing damage to the vehicle has occurred or is expected to occur based on the sensor data being greater than an identified threshold that is based on an on-off status of the vehicle, wherein:

a set of thresholds associated with a sensor type of the sensor, wherein a first threshold of the set of thresholds is associated with the on-off status of the vehicle indicating that the vehicle is turned on and a second threshold of the set of thresholds is associated with the on-off status of the vehicle indicating that the vehicle is turned off, and an additional set of thresholds associated with an additional sensor type of an additional sensor of the vehicle, wherein a third threshold of the additional set of thresholds is associated with the on-off status of the vehicle indicating that the vehicle is turned on and a fourth threshold of the additional set of thresholds is associated with the on-off status of the vehicle indicating that the vehicle is turned off;

transmitting, to a server and based on whether the event has occurred or is expected to occur, a portion of video data captured by a camera of the vehicle, wherein the video data is of a scene associated with the vehicle that is continuously captured by the camera; and transmitting, to a mobile device of a user associated with the vehicle, an indication of the event and the portion of the video data.

22. The method of claim 21, further comprising:

transmitting, to the server, the indication of the event and the portion of the video data;

receiving, from the server, an event report that indicates one or more of: a person associated with the event, another vehicle associated with the event, a license plate associated with the event, a building associated with the event, or signage associated with the event; and transmitting the event report to the mobile device.

23. The method of claim 21, further comprising determining a type of event based on at least one of the sensor data, the on-off status of the vehicle, or the sensor type, wherein the type of event is one of: a vehicle collision, a vehicle break-in, or vehicle vandalism.

24. The method of claim 21, further comprising:

determining a duration of time associated with the event based on at least one of the sensor data or a type of event, wherein the duration of time includes a time period prior to the event and a time period after the event; and generating the portion of the video data based on the duration of time associated with the event.

25. The method of claim 21, wherein:

the sensor data is gyroscope data indicating angular velocity changes associated with the vehicle; and the sensor type corresponds to a gyroscope.

* * * * *